(12) United States Patent
Chepel

(10) Patent No.: US 12,394,230 B2
(45) Date of Patent: Aug. 19, 2025

(54) SYSTEMS AND METHODS FOR DETECTING USER CREATED CIRCULAR SHAPED INDICATIONS USING MACHINE LEARNING MODELS

(71) Applicant: Aetna Inc., Hartford, CT (US)

(72) Inventor: Maksim Chepel, Hartford, CT (US)

(73) Assignee: Aetna Inc., Hartford, CT (US)

( * ) Notice: Subject to any disclaimer, the term of this patent is extended or adjusted under 35 U.S.C. 154(b) by 560 days.

(21) Appl. No.: 17/879,353

(22) Filed: Aug. 2, 2022

(65) Prior Publication Data

US 2024/0046676 A1 Feb. 8, 2024

(51) Int. Cl.
*G06V 30/14* (2022.01)
*G06V 30/20* (2022.01)
*G06V 30/412* (2022.01)

(52) U.S. Cl.
CPC .......... *G06V 30/1448* (2022.01); *G06V 30/20* (2022.01); *G06V 30/412* (2022.01)

(58) Field of Classification Search
CPC ... G06V 30/1448; G06V 30/20; G06V 30/412
See application file for complete search history.

(56) References Cited

U.S. PATENT DOCUMENTS

| 10,872,236 | B1* | 12/2020 | Elor | G06V 30/1452 |
| 10,970,530 | B1* | 4/2021 | Adam | G06V 30/416 |
| 11,087,081 | B1* | 8/2021 | Srivastava | G06F 40/169 |
| 2020/0293608 | A1* | 9/2020 | Nelson | G06F 40/169 |
| 2020/0364451 | A1* | 11/2020 | Ammar | G06V 10/768 |
| 2022/0245954 | A1* | 8/2022 | Wu | G06N 3/044 |
| 2022/0319219 | A1* | 10/2022 | Tsibulevskiy | G06F 18/40 |
| 2023/0065934 | A1* | 3/2023 | Lingineni | G06V 30/416 |
| 2023/0153602 | A1* | 5/2023 | Truong | G06N 3/0475 |
|  |  |  |  | 706/12 |
| 2023/0169328 | A1* | 6/2023 | Haptonstahl | G06N 3/08 |
|  |  |  |  | 706/15 |
| 2023/0325597 | A1* | 10/2023 | Tambi | G06F 40/35 |
|  |  |  |  | 704/9 |

* cited by examiner

*Primary Examiner* — Qun Shen
(74) *Attorney, Agent, or Firm* — Leydig, Voit & Mayer, Ltd.

(57) ABSTRACT

In some instances, a method is provided. The method comprises: obtaining, by a computing system, a plurality of documents, wherein at least one document, of the plurality of documents, comprises one or more circular shaped user indications, wherein each of the one or more circular shaped user indications indicates a user selection of a design or text within the associated circular shaped user indication; determining, by the computing system, circular shaped identification information for a document, of the plurality of documents based on inputting the document into a trained machine learning—artificial intelligence (ML-AI) model, wherein the circular shaped identification information indicates the user selection of the design or the text within the associated circular shaped user indication; and performing, by the computing system, one or more actions based on the circular shaped identification information.

20 Claims, 9 Drawing Sheets

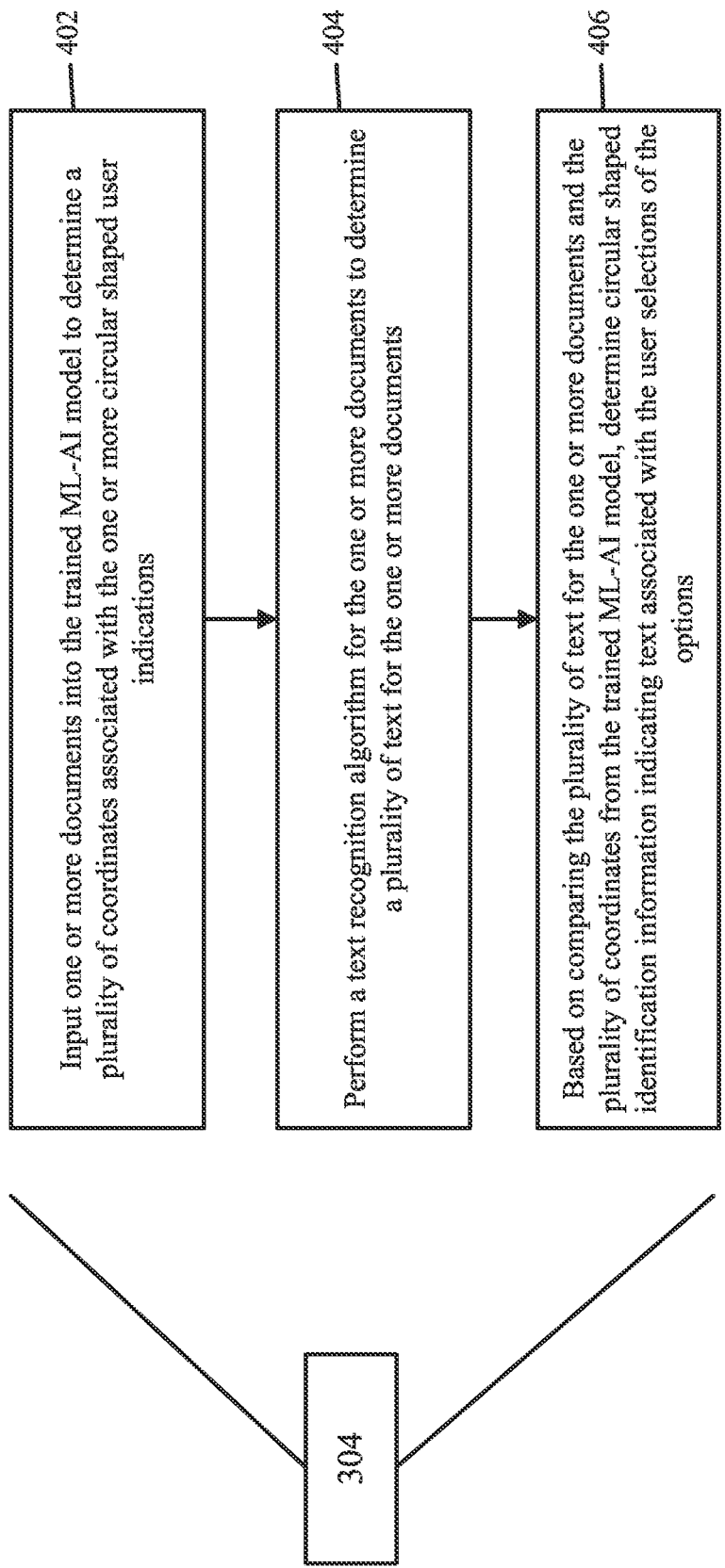

C. Individuals enrolling—List individuals enrolling or adding, changing or removing coverage. If more space is needed check here ☐ and use a seperate sheet of paper.

| (A)dd (C)hange (R)emove | Last name, first name, middle initial | Sex (M/F) | Birthdate (MM/DD/YYYY) | Height | Weight | Tobacco or nicotine use (including E-cigarette devices) |
|---|---|---|---|---|---|---|
| | ☒ Employee 1. Person A | M | 02/29/1980 | 4'7" | 125 lb | ☐ Yes ☒ No  ← 502 |
| | ☒ Spouse ☐ Civil union ☐ Domestic partner 2. Person B | F | 03/13/1983 | 4'5" | 115 lb | ☐ Yes ☒ No |
| | ☒ Child ☐ Stepchild ☐ Other 3. Person C | F | 09/29/1999 | 2'11" | 65 lb | ☐ Yes ☒ No |
| | ☒ Child ☐ Stepchild ☐ Other 4. Person D | M | 11/5/2002 | 2'3" | 45 lb | ☐ Yes ☒ No |
| | ☐ Child ☐ Stepchild ☐ Other 5. | | | | | ☐ Yes ☐ No |

D. Health Questionnaire—Complete for all individuals enrolling for coverage

Have you or anyone applying for coverage consulted with or been examined, diagnosed, or treated by any health care professionals during the last 5 (five) years for any illness, injury or health condition in any of the categories listed below? If "yes" please check the box that most appropriately describes the condition(s) and explain fully below (page 4).

1. Cancer/tumor/cyst ☐ Yes ☒ No

☐ Brain ☐ Breast ☐ Esophagus ☐ Stomach ☐ Colon ☐ Leukemia ☐ Lymphoma ☐ Multiple myeloma ☐ Kidney ☐ Liver ☐ Lung ☐ Melanoma ☐ Pancreas ☐ Prostate
☐ Testicular ☐ Cervical ☐ Ovarian ☐ Uterine ☐ Throat ☐ Thyroid ☐ Other cancer (type/location_____) ☐ Non-malignant tumor (type/location_____)
Diagnosis date_____ Cancer stage (0-4)_____ (if known) Cancer category (in situ, localized, regional, distant)_____ (if known)
Treatment: ☐ Surgery date_____ ☐ Chemo timeframe_____ ☐ Radiation timeframe_____
☐ Remission ☐ Yes ☐ No If yes, provide date of remission_____

2. Heart/vascular ☐ Yes ☒ No

☐ Aneurysm (location_____) ☐ Blocked arteries (e.g., carotid, heart, abdomen, legs) ☐ Heart attack ☐ Heart valve disorder ☐ Congestive heart failure
☐ Cardiomyopathy ☐ Irregular or abnormal heart rhythm ☐ Stroke ☐ Vasculitis (type_____) ☐ Bypass/angioplasty/stent (location_____)
☐ Pacemaker or cardiac defibrillator ☐ Other (specify details below)

MEMBER INFORMATION

Name: Person A _____ ID Number ____ ID Number for Person A

Date of Birth: 09/12/2015 _____ PCP Name: _____

Other Insurance? / Policy Holder / Policy Number: NO

Gender (circle one): (F) M
                        ↖ 602

AUTHORIZATION INFORMATION

Diagnosis/ICD-10 Code(s) (Required*)

1. I83.893   2. _____   3. _____   4. _____   5. _____

Service/Procedure requested (CPT or HCPCS codes Required*):

1. 36466   4. _____   7. _____

2. _____   5. _____   8. _____

3. _____   6. _____   9. _____

Type of Procedure/Level of care (circle one):   Inpatient   (Outpatient)   In Office
                                                              ↖ 604

Date(s) of service: Not scheduled  Number of visits/units:  1 GSV right
                    yet                                     1 GSV left

| Patient Name: | Last | First | MI | Date of Birth: |
| --- | --- | --- | --- | --- |
| | Person A | | | 4/20/1975 |

| I.D. #: | | Gender: | EPSDT special service request? |
| --- | --- | --- | --- |
| 1004568765 | | M (F) | YES (NO) |

| Other Insurance? | Name of Carrier? | Job Related? | MVA? | Is the member currently pregnant? |
| --- | --- | --- | --- | --- |
| YES (NO) | | YES (NO) | YES (NO) | YES (NO) |

| Physician/Provider/Facility Requested: | Address: | Telephone: | Fax: | KY Medicaid Provider # |
| --- | --- | --- | --- | --- |
| Smile MD Mobile unit | | | | (Smile MD) 7100651450 |

| Where services will be rendered? (provide name of facility, if other than provider office or patient's home) Smile MD Mobile unit will come to requesting providers office. | Tentative Date of Service/Admission: 2/18/21 |
| --- | --- |
| | Start Date: 2/18/21 |

| Today's Date: 2/2/21 | End Date: / / |
| --- | --- |

| Were member school based services interrupted? |
| --- |
| YES (NO) |

CONFIDENTIAL FAX

TO: Prior Auth   FROM: _____
ADDRESS: _____
PHONE # _____   DATE AND TIME _____
                     PAGES _____
RE:   IPOT  802   CC: _____

URGENT   ⟨FOR REVIEW   PLEASE REPLY⟩

MESSAGE:   Please review

G. Individuals enrolling–List individuals enrolling or adding/changing/removing coverage. If more space is needed check here ☐ and use a separate sheet of paper.

| (A)dd (C)hange (R)emove | Name (Last, First, M.I.) | Sex (M/F) | Social Security Number | Birthdate (MM/DD/YYYY) | Height | Weight | Tobacco Use (including eCigarette devices) | Currently Taking Prescription Medication(s) | Incapacitated |
|---|---|---|---|---|---|---|---|---|---|
| | ☒ Employee 1. Person A | M | | | 5'9" | 190 | ☐ Yes ☒ No | ☒ Yes ☐ No | ☐ Yes ☒ No |
| | ☐ Spouse ☐ Domestic partner 2. | | | | | | ☐ Yes ☐ No | ☐ Yes ☐ No | ☐ Yes ☐ No |
| | ☐ Child ☐ Stepchild ☐ Other 3. | | | | | | ☐ Yes ☐ No | ☐ Yes ☐ No | ☐ Yes ☐ No |
| | ☐ Child ☐ Stepchild ☐ Other 4. | | | | | | ☐ Yes ☐ No | ☐ Yes ☐ No | ☐ Yes ☐ No |

H. Health Questionnaire–Complete for all individuals enrolling for coverage

Have you or anyone applying for coverage consulted with or been examined, diagnosed, or treated by any health care professional during the last 5 (five) years for any illness, injury or health condition in any of the categories listed below? If "yes" please check the box that most appropriately describes the condition(s), circle the applicable condition(s), and explain fully below.

1. Bone/Muscle: Arthritis, (Back/Neck/Spine problems) Joint disorders, Joint replacement, Herniated disc, Other. Brain/Nervous: Epilepsy (Seizures), Paralysis/Paresis, Pituitary disorder, Stroke, Other. Heart/Circulatory: Chest pain, Congestive Heart Failure, Heart Attack, Heart Disease, Hemophilia, (High Blood Pressure) Sickle Cell Disease, Other. Immune: AIDS/HIV, Connective Tissue Disorder, Immunodeficiency, Systemic or Discoid Lupus, Other. Intestinal/Endocrine: Adrenal disorder, Cirrhosis, Crohn's, Diabetes Type I or Type II, Digestive disorder, (GERD (reflux)) Hepatitis B,C or other, Liver or Pancreas disorder, Stomach ulcer, Ulcerative Colitis, Other. Lung/Respiratory: COPD, Emphysema, Other. Substance Abuse: Alcohol or Drug Abuse. Reproductive: Infertility, Pregnant-normal birth expected, Pregnant-high risk, Pregnant-multiple births expected, Other. Transplant: Organ or Bone Marrow Transplant (planned, recommended or already performed). Tumor: Fibroids (location), Other. Urinary: Bladder disorder, Dialysis, Kidney failure, Kidney stones, Other. Other: Birth defects/Congenital abnormality, Growth disorder (including Dwarfism or receiving growth hormones), Paralysis or Paresis, Prosthesis, Other.

2. Cancer: Type _____ Stage _1_ Check applicable boxes ☐ Surgery date _____ ☐ Chemo end date _____     ☒ Yes ☐ No
   ☐ Radiation end date _____

3. Is anyone applying for coverage been advised they need future hospitalization or have surgical procedures been planned, discussed, or recommended, or has any other medical condition which has not been disclosed? Provide full details below.     ☐ Yes ☒ No

SYSTEMS AND METHODS FOR DETECTING USER CREATED CIRCULAR SHAPED INDICATIONS USING MACHINE LEARNING MODELS

BACKGROUND

Traditionally, text recognition algorithms such as optical character recognition (OCR) algorithms are used to convert images of typed, handwritten, or printed text into machine-encoded text. For instance, a document such as a scanned document, a photo, an image, or any other type of file may include text. The OCR algorithms may be used to convert the document into machine-encoded text that is usable in a plurality of different applications for an enterprise organization. For instance, an enterprise organization may use text recognition algorithms to extract content from numerous different documents fairly quickly. In certain documents, a person may provide user selections such as marking a checkbox or other features to indicate their selection. For marking a checkbox or circling in an oval, standard algorithms may be used to detect the user selection. However, in some instances, the person may seek to select a design or certain text (e.g., "F" or "M" for gender) within a document. For instance, the person may circle an option (e.g., "M"), but these circles may vary between user selections (e.g., a first circular selection may be different from a second circular selection, even in the same document). These user created indications that are circling text or designs may be difficult for a system using standard algorithms to process and assess the user's selections as they are not pre-defined beforehand. Accordingly, there remains a technical need to be able to detect user created indications.

SUMMARY

In some examples, the present application may use machine learning (e.g., artificial intelligence) algorithms, models, and/or datasets to detect user created circular selections within one or more documents. For example, a person may provide user created circular selections to select between different options within a document (e.g., the document may request the person to answer a question and the person may circle "yes" or "no" in response). Traditionally, conventional algorithms are able to detect whether a checkbox is checked or whether an oval is circled (e.g., by using boundary detection and checking if there is checkmark, filling, or other user marks within the checkbox or oval). But, the document may include designs (e.g., images, logos, emoticons, and other types of graphics) or text, and these do not have standard boundaries. For instance, each text selection may have different characters (e.g., "Male" or "Female") and therefore do not have set boundaries. For images, each image or logo selection may be of a different size. As such, standard algorithms are not able to reliably detect user created circular selections of text or designs much less able to determine what the user actually selected (e.g., what the text says or what the design represents). Accordingly, the present application uses machine learning—artificial intelligence (ML-AI) to determine user created circular shaped selections/indications (e.g., circular shaped user indications) of text and/or designs. For instance, a computing system may input the document into the ML-AI model, algorithm, and/or dataset (e.g., ML-AI model), which may output one or more results indicating a potential user selection (e.g., coordinates of the detected circular shaped user indications) and a confidence score. Additionally, and/or alternatively, the computing system may further use a text recognition algorithm (e.g., an OCR algorithm) to extract text from the document. Based on the extracted text and/or the results from the ML-AI model, the computing system may determine the user selection. Afterwards, the computing system may perform one or more functions based on the user selection.

In one aspect, a method is provided. The method comprises: obtaining, by a computing system, a plurality of documents, wherein at least one document, of the plurality of documents, comprises one or more circular shaped user indications, wherein each of the one or more circular shaped user indications indicates a user selection of a design or text within the associated circular shaped user indication; determining, by the computing system, circular shaped identification information for a document, of the plurality of documents based on inputting the document into a trained machine learning—artificial intelligence (ML-AI) model, wherein the circular shaped identification information indicates the user selection of the design or the text within the associated circular shaped user indication; and performing, by the computing system, one or more actions based on the circular shaped identification information.

Examples may include one of the following features, or any combination thereof. For instance, in some examples, performing the one or more actions comprises causing display of one or more images of the text within the associated circular shaped user indication.

In some instances, determining the circular shaped identification information comprises: inputting the document into the ML-AI model to determine a plurality of coordinates, wherein each subset of the plurality of coordinates is associated with a circular shaped user indication of the one or more circular shaped user indications within the document, and wherein determining the circular shaped identification information is based on the plurality of coordinates.

In some variations, each of the subsets of the plurality of coordinates comprise ML-AI coordinate points indicating a detected location of the circular shaped user indication within the document, and wherein determining the circular shaped identification information comprises determining the text associated with the detected location of the circular shaped user indication within the document.

In some instances, determining the text associated with the detected location of the circular shaped user indication within the document comprises: performing a text recognition algorithm for the document to determine a plurality of extracted text for the document and a plurality of extracted coordinate points associated with the plurality of extracted text; and determining the circular shaped identification information based on comparing the ML-AI coordinate points with the plurality of extracted coordinate points.

In some examples, the text recognition algorithm is an optical character recognition algorithm.

In some variations, the method further comprises: training the ML-AI model to detect the one or more circular shaped user indications, wherein the ML-AI model is a supervised ML-AI model.

In some instances, the training the ML-AI model comprises training, by a second computing system, the ML-AI model, and wherein the method further comprises: subsequent to training the ML-AI model, receiving, by the computing system and from the second computing system, the trained ML-AI model.

In some examples, a second document, of the plurality of documents, does not comprise circular shaped user indications, and wherein the method further comprises: determining, using the trained ML-AI model, that the second document does not comprise the circular shaped user indications.

In some variations, the method further comprises: obtaining design information associated with the plurality of documents; identifying the user selection of the design within the associated circular shaped user indication using the design information; and wherein the circular shaped identification information indicates the identified design.

In some instances, performing the one or more actions comprises storing the circular shaped identification information in a database.

In some examples, performing the one or more actions comprises converting the circular shaped identification information into a standardized file format, wherein the standardized file format is a JavaScript Objection Notation (JSON) file format.

In another aspect, an enterprise circular detection computing system is provided. The computing system comprises: one or more processors; and a non-transitory computer-readable medium having processor-executable instructions stored thereon, wherein the processor-executable instructions, when executed, facilitate: obtaining a plurality of documents, wherein at least one document, of the plurality of documents, comprises one or more circular shaped user indications, wherein each of the one or more circular shaped user indications indicates a user selection of a design or text within the associated circular shaped user indication; determining circular shaped identification information for a document, of the plurality of documents based on inputting the document into a trained machine learning—artificial intelligence (ML-AI) model, wherein the circular shaped identification information indicates the user selection of the design or the text within the associated circular shaped user indication; and performing one or more actions based on the circular shaped identification information.

Examples may include one of the following features, or any combination thereof. For instance, in some examples, determining the circular shaped identification information comprises: inputting the document into the ML-AI model to determine a plurality of coordinates, wherein each subset of the plurality of coordinates is associated with a circular shaped user indication of the one or more circular shaped user indications within the document, and wherein determining the circular shaped identification information is based on the plurality of coordinates.

In some instances, each of the subsets of the plurality of coordinates comprise ML-AI coordinate points indicating a detected location of the circular shaped user indication within the document, and wherein determining the circular shaped identification information comprises determining the text associated with the detected location of the circular shaped user indication within the document.

In some variations, determining the text associated with the detected location of the circular shaped user indication within the document comprises: performing a text recognition algorithm for the document to determine a plurality of extracted text for the document and a plurality of extracted coordinate points associated with the plurality of extracted text; and determining the circular shaped identification information based on comparing the ML-AI coordinate points with the plurality of extracted coordinate points.

In some instances, the text recognition algorithm is an optical character recognition algorithm.

In some variations, the processor-executable instructions, when executed, further facilitate: training the ML-AI model to detect the one or more circular shaped user indications, wherein the ML-AI model is a supervised ML-AI model.

In some examples, the processor-executable instructions, when executed, further facilitate: obtaining design information associated with the plurality of documents; identifying the user selection of the design within the associated circular shaped user indication using the design information; and wherein the circular shaped identification information indicates the identified design.

In yet another aspect, a non-transitory computer-readable medium having processor-executable instructions stored thereon is provided. The processor-executable instructions, when executed, facilitate: obtaining a plurality of documents, wherein at least one document, of the plurality of documents, comprises one or more circular shaped user indications, wherein each of the one or more circular shaped user indications indicates a user selection of a design or text within the associated circular shaped user indication; determining circular shaped identification information for a document, of the plurality of documents based on inputting the document into a trained machine learning—artificial intelligence (ML-AI) model, wherein the circular shaped identification information indicates the user selection of the design or the text within the associated circular shaped user indication; and performing one or more actions based on the circular shaped identification information.

All examples and features mentioned above may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following:

FIG. 4 is an exemplary process for using a machine learning model to determine user selections of an option using a circular shaped user indication in accordance with one or more examples of the present application.

FIGS. 5-9 show documents with user input in accordance with one or more examples of the present application.

DETAILED DESCRIPTION

Examples of the presented application will now be described more fully hereinafter with reference to the accompanying FIGS., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
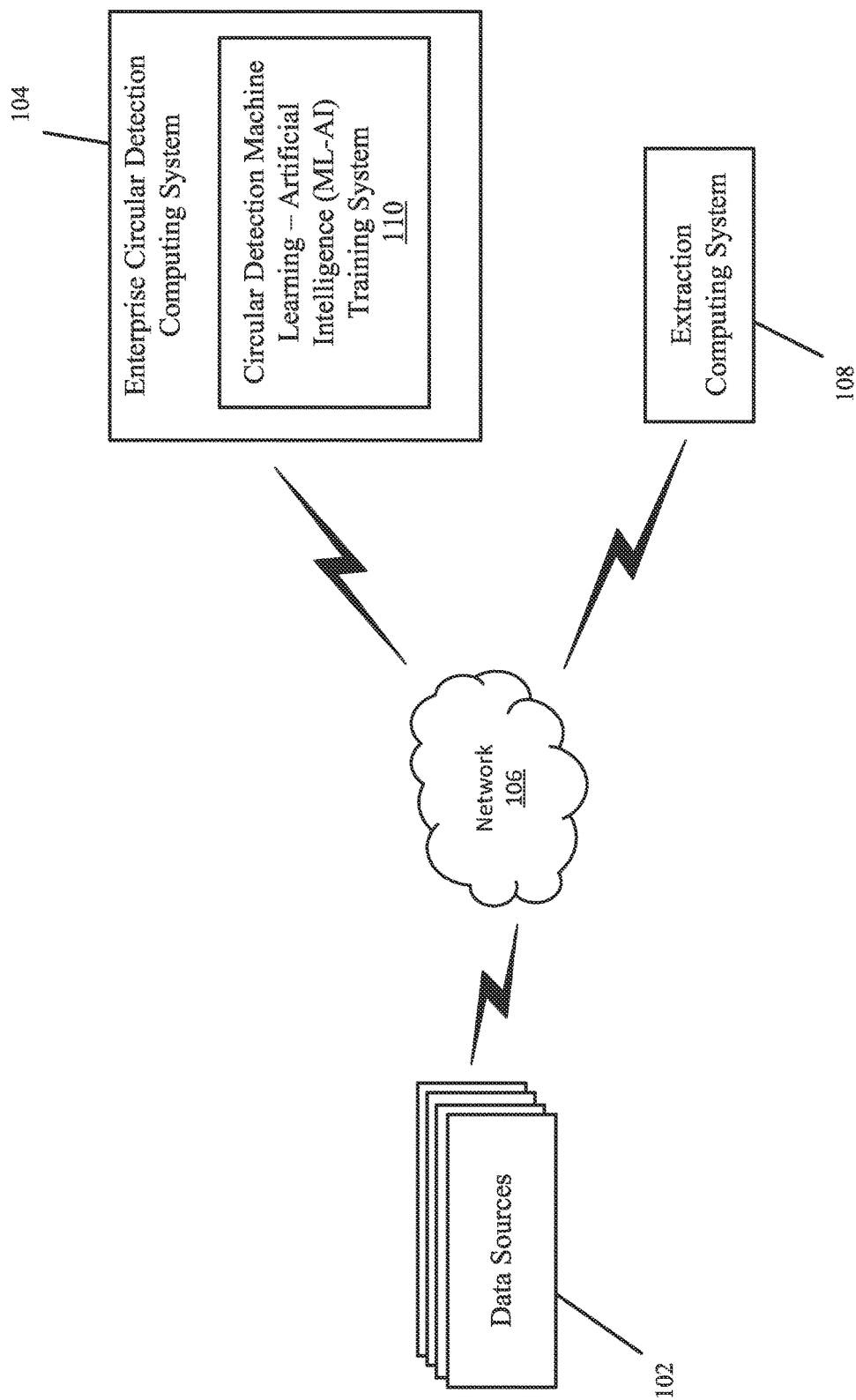
FIG. 1 is a simplified block diagram depicting an exemplary computing environment in accordance with one or more examples of the present application.

Systems, methods, and computer program products are herein disclosed that provide for determining user selections of design or text within user created circular shaped indications using machine learning models. FIG. 1 is a simplified block diagram depicting an exemplary environment in accordance with an example of the present application. The environment 100 includes a plurality of data sources 102, an extraction computing system 108, and an enterprise circular detection computing system 104. The enterprise circular detection computing system 104 includes a circular detection machine learning—artificial intelligence (ML-AI) training system 110. Although the entities within environment 100 may be described below and/or depicted in the FIGS. as being singular entities, it will be appreciated that the entities and functionalities discussed herein may be implemented by and/or include one or more entities.

The entities within the environment 100 such as the plurality of data sources 102, the extraction computing system 108, and the enterprise circular detection computing system 104 may be in communication with other systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. Additionally, and/or alternatively, the devices or systems within environment 100 may be in communication with each other without using the network 106. For instance, the data sources 102 may directly provide their information to the enterprise circular detection computing system 104 using one or more wired connections and/or one or more communication protocols.

Each of the data sources 102 is and/or includes one or more computing devices and/or systems that are configured to provide data (e.g., data files or documents) to the enterprise circular detection computing system 104. For example, the data sources 102 are and/or include one or more computing devices, computing platforms, systems, servers, desktops, laptops, tablets, mobile devices (e.g., smartphone device, or other mobile device), or any other type of computing device that generally comprises one or more communication components, one or more processing components, and one or more memory components.

The data sources 102 are capable of performing tasks, functions, and/or other actions associated with an enterprise organization. For example, the data sources 102 may receive, generate, and/or otherwise obtain documents such as images, files, photos, portable document format (PDF) documents, and/or other types of electronic files that include text, characters, images, logos, designs, pictures, user selections, and/or other indicia. For instance, the data sources 102 may be associated with medical providers, doctors, and/or other users within a healthcare industry. These users may scan, email, fax, and/or otherwise generate and/or obtain documents (e.g., PDFs) and use the data sources 102 to provide them to the enterprise circular detection computing system 104. In some instances, the data sources 102 may include servers, computing systems, and/or other types of computing devices that are capable of storing the documents from the users. For instance, a first data source 102 may obtain one or more documents from one or more users and provide the documents to a second data source 102 (e.g., a server) that stores the documents. The documents may be sorted, converted, and/or otherwise standardized, and stored in specific storage locations (e.g., folders). The circular detection system 104 may obtain (e.g., receive and/or retrieve) the documents from the storage locations using one or more application programming interfaces (APIs), and use a ML-AI model to determine user selections of design or text within user created circular shaped indications. Additionally, and/or alternatively, a personal user may use their own mobile phone and/or a tablet to execute a mobile application to generate the documents (e.g., PDFs). Subsequently, the circular detection system 104 may obtain the documents from the mobile phones or tablets.

In some examples, the document may be a form (e.g., a standard form) such as the forms shown in FIGS. 5 and 6, and an individual may provide information on that form. In particular, FIGS. 5 and 6 show documents with user provided input in accordance with one or more examples of the present application. For example, referring to FIG. 5, document 500 includes user input such as the name of the employee "Person A", the sex of the employee "M", the birthdate of the employee "02/29/1980", and so on. Additionally, document 500 includes standard checkboxes for user selections. For instance, for "Tobacco or nicotine use", the individual selected "No" in the checkbox 502. Similarly, the individual selected "No" in other checkboxes, which describes whether the individual has had "Cancer/tumor/cyst" or "Heart/vascular" problems. For these checkboxes, as the checkboxes typically have a distinct and replicable structure/shape (e.g., each checkbox are box or square shaped with straight edges of a certain dimension and there is a marking within the checkbox indicating the user selection) and no text or designs within them, a conventional algorithm may be used to determine the user selection (e.g., whether the individual uses Tobacco or nicotine). In other words, traditional or conventional algorithms may be able to determine user selections when the user fills in or uses a checkbox within the distinct user selection boundaries of the checkbox such as within a square boundary that defines the checkbox (e.g., within checkbox 502). For instance, the traditional or conventional algorithms may use boundary detection processes to detect these distinct boundaries (e.g., the checkboxes), and then determine whether an individual has placed a mark within the boundary. If so, the conventional algorithm may provide an indication indicating the selection made by the individual.

However, referring to FIG. 6 and document 600, certain types of user indications such as user created circular shaped selections/indications (e.g., circular shaped user indications) do not have a distinct nor replicable structure and shape. These user indications also include text or designs (e.g., logos, images, emoticons, and/or other designs) within them that the user has selected. For instance, for any document that requests user feedback by the individual circling the feedback such as circle whether the "Gender" of the person A is male ("M") or female ("F"), each selection may be unique and there is not a distinct boundary to search for. For example, the user selection (e.g., the circular shaped user indication) 602 and the user selection 604 are both different, but still show a user selection of an option (e.g., for the type of procedure/level of care, which is indicated as outpatient by the circular shaped user indication 604 and for the gender, which is indicated by the circular shaped user indication 602). Therefore, traditional or conventional algorithms are not capable of reliably detecting these circular shaped user indications such as the ones shown in document 600 much less determining or identifying the text or design within the circular shaped user indications. Circular shaped user indications may be any type of circular shaped, oval shaped, semi-rectangular shaped, or other types of shaped user selections that denote selections of text and/or designs within the circular shaped user indications. For instance, as shown, the circular shaped user indications show selections of text by the user. Further, because the selection of Gender is one character long whereas the type of procedure/level of care is multiple characters long (e.g., "Inpatient", "Outpatient" or "In Office"), the circular shaped user indications may vary. In some instances, each individual may provide different types of circular shaped user indications such as fully closing the circular shaped indication, not fully closing the circular shaped indications (e.g., as shown in circular shaped user indication 602), or leaving a tail for the circular shaped indications (e.g., as shown in circular shaped user indication 604).

Accordingly, after the data sources 102 obtain the documents such as document 500 and 600, the data sources 102 may provide the documents to another entity within environment 100 such as the extraction computing system 108 and/or the enterprise circular detection computing system 104. Then, as will be explained below, the extraction computing system 108 and/or the enterprise circular detection computing system 104 may use ML-AI models (e.g., models, datasets, and/or algorithms) to detect the circular shaped user indications within the documents (e.g., indications 602 and 604), determine the actual user selections (e.g., female indicated by the selection of indication 602 or outpatient indicated by the selection of indication 604) within the circular shaped user indications, and/or provide the user selections to another entity.

In some variations, the data sources 102 may be implemented as engines, software functions, and/or applications. In other words, the functionalities of the data sources 102 may be implemented as software instructions stored in storage (e.g., memory) and executed by one or more processors.

The enterprise circular detection computing system 104 is a computing system that is associated with the enterprise organization. The enterprise organization may be any type of corporation, company, organization, and/or other institution. The enterprise circular detection computing system 104 includes one or more computing devices, computing platforms, systems, servers, and/or other apparatuses capable of performing tasks, functions, and/or other actions for the enterprise organization. In some instances, the enterprise circular detection computing system 104 may, for example, receive information from the data sources 102 and/or provide information to the extraction computing system 108. For instance, the enterprise circular detection computing system 104 may receive documents such as documents 500 and/or 600 from the data sources 102, and may use one or more ML-AI models (e.g., ML-AI models, datasets, and/or algorithms) to determine user selections (e.g., user selections within the circular shaped user indications) within the documents from the data sources 102.

The enterprise circular detection computing system 104 includes a circular detection ML-AI training system 110. The training system 110 may train one or more ML-AI models such that the ML-AI models are capable of detecting circular shaped user indications/selections such as the indications 602 and 604 shown in FIG. 6. Subsequently, the computing system 104 may use the one or more ML-AI models to detect circular shaped user indications within the documents and/or determine user selections associated with the circular shaped user indications (e.g., by using a text recognition algorithm such as an OCR algorithm). The enterprise circular detection computing system 104 may provide the determined user selections associated with the circular shaped user indications and/or other data to the extraction computing system 108.

The enterprise computing system 104 may be implemented using one or more computing platforms, devices, servers, and/or apparatuses. For instance, in some examples, a single computing platform may perform the functionalities of the training system 110 and detect the user selections using the trained AI-ML model. In other examples, separate computing platforms may be used to perform the functionalities of the training system 110 and detect the user selections using the trained AI-ML model. In some variations, the enterprise computing system 104 may be implemented as engines, software functions, and/or applications. In other words, the functionalities of the enterprise computing system 104 may be implemented as software instructions stored in storage (e.g., memory) and executed by one or more processors.

The extraction computing system 108 may be and/or include, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The extraction system 108 may be able to execute software applications managed by, in communication with, and/or otherwise associated with the enterprise organization. Additionally, and/or alternatively, the extraction computing system 108 may be configured to perform other functions.

The extraction computing system 108 and/or the enterprise circular detection computing system 104 may be configured to perform one or more actions after detecting and/or obtaining the user selections (e.g., the text or designs within the circular shaped user indications). For example, the computing system 104 and/or 108 may include and/or be associated with a database that receives the detected user selections. The database may store the detected user selections, and a computing device or entity may retrieve and use the detected user selections for one or more functions. For instance, the computing system 104 and/or 108 may store the detected user selections in a database. Then, the computing system 104, 108, and/or another computing entity may retrieve the user selections from the database and use the user selections.

In some instances, the computing system 104 and/or 108 may include and/or be in communication with a display device that displays the detected user selections. For instance, the computing system 104 and/or 108 may display the detected user selections on the display device.

Additionally, and/or alternatively, the computing system 104 and/or 108 may standardize and/or convert the detected user selections from the documents into a patient profile. For example, the computing system 104 and/or 108 may convert and/or standardize the detected user selections into a particular file format (e.g., a JavaScript Objection Notation (JSON) file format). The computing system 104 and/or 108 may store the converted/standardized user selections into the database and/or provide the converted/standardized user selections to another entity. For instance, the computing system 104 and/or 108 may include a database for patient history, and based on the detected user selections, the computing system 104 and/or 108 may standardize/convert the detected user selections so as to be able to be stored within the database. Additionally, and/or alternatively, the computing system 104 and/or 108 may use the detected user selections for payment information (e.g., providing and/or verifying checks or other payment information from creditors). For instance, the documents may provide descriptions for a check or other documentation regarding payment, and the detected user selections may indicate the provided descriptions. Then, the computing system 104 and/or 108 may use the detected user selections to process the payment information.

It will be appreciated that the exemplary environment depicted in FIG. 1 is merely an example, and that the principles discussed herein may also be applicable to other situations—for example, including other types of institutions, organizations, devices, systems, and network configurations. As will be described herein, the environment 100 may be used by health care enterprise organizations. However, in other instances, the environment 100 may be used by other types of enterprise organizations such as financial institutions or insurance institutions.

Figure 2:
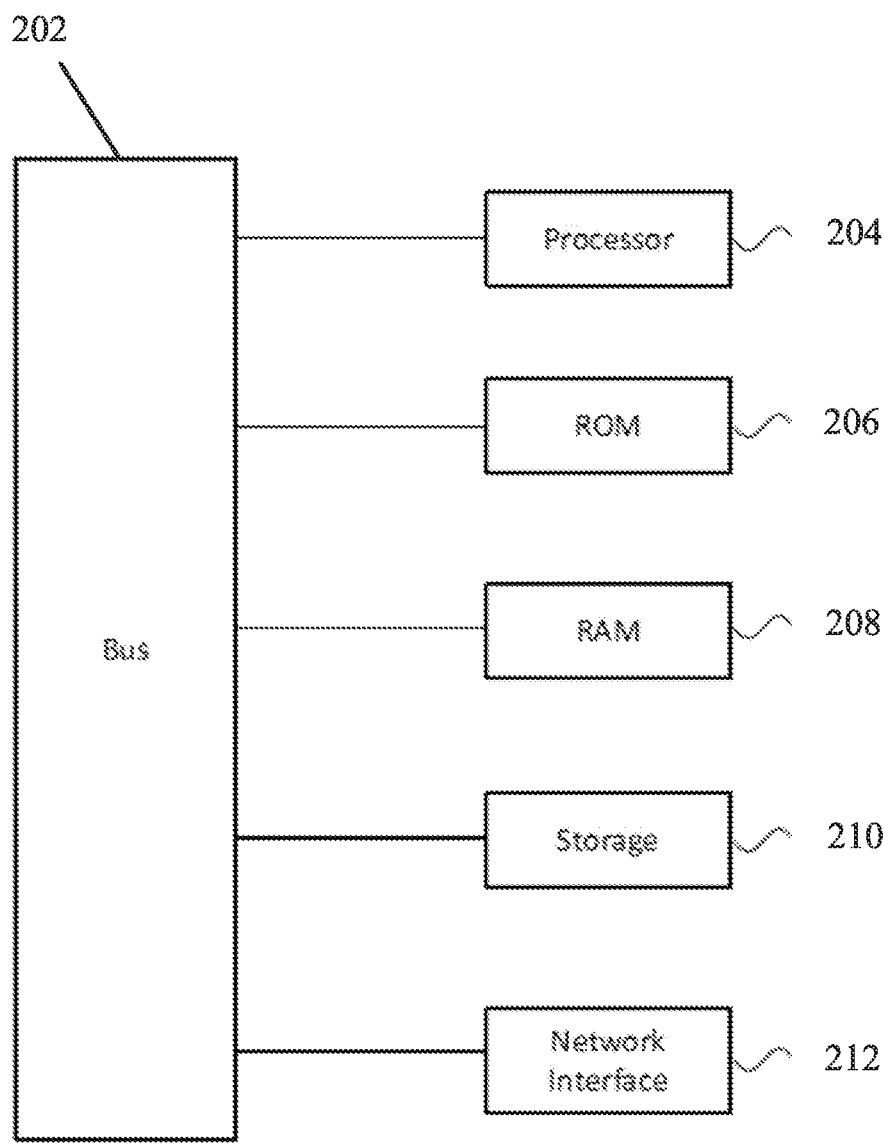
FIG. 2 is a simplified block diagram of one or more devices or systems within the exemplary environment of FIG. 1.

FIG. 2 is a block diagram of an exemplary system and/or device 200 (e.g., the data sources 102, the extraction computing system 108, and/or the enterprise circular detection computing system 104) within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3:
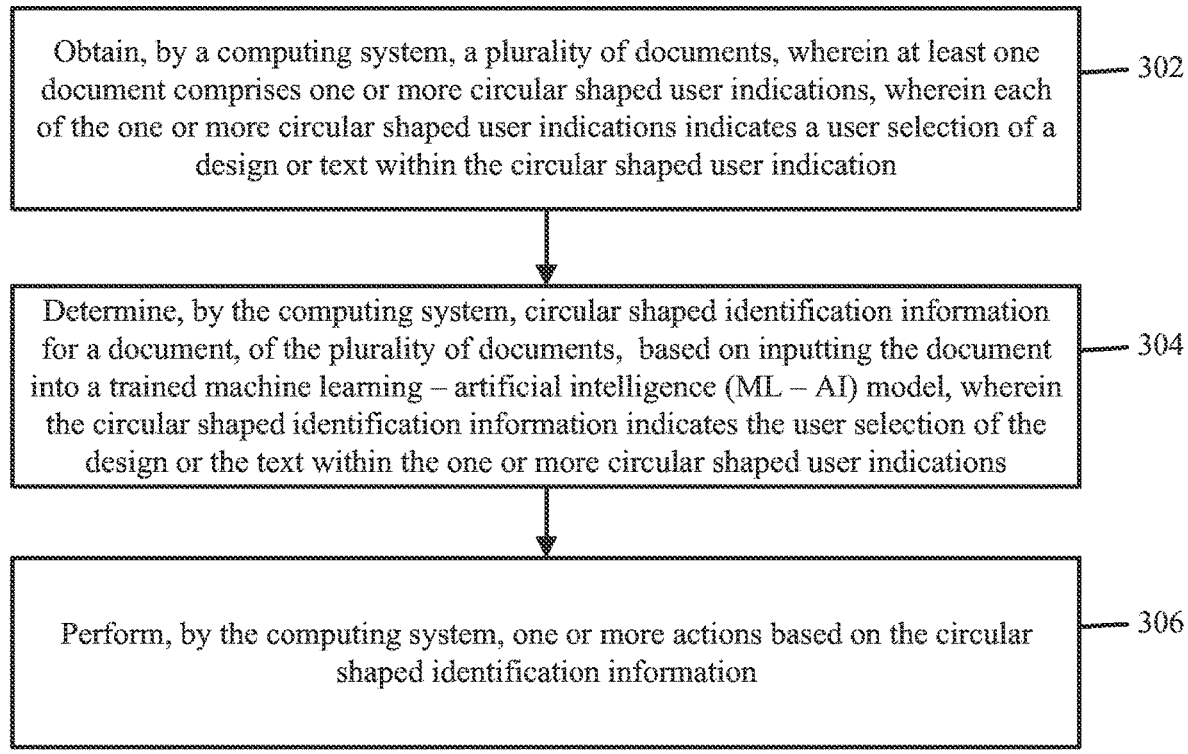
FIG. 3 is an exemplary process for using a machine learning model to determine user selections of an option using a circular shaped user indication in accordance with one or more examples of the present application.

FIG. 3 is an exemplary process for using a machine learning model to determine user selections of an option using a circular shaped user indication in accordance with one or more examples of the present application. The process 300 may be performed by the enterprise circular detection computing system 104 (computing system 104) of environment 100 shown in FIG. 1. Additionally, and/or alternatively, the process 300 may be performed by the extraction computing system 108. However, it will be recognized that the process 300 may be performed in any suitable environment and that any of the following blocks may be performed in any suitable order. The descriptions, illustrations, and processes of FIG. 3 are merely exemplary and the process 300 and/or the computing system 104 may use other descriptions, illustrations, and processes for determining user selections within user created circular shaped indications using machine learning models.

At block 302, a computing system 104 obtains a plurality of documents, wherein at least one document comprises one or more circular shaped user indications, wherein each of the one or more circular shaped user indications indicates a user selection of a design or text within the circular shaped user indication. For example, as mentioned previously, individuals may manually fill out documents, which include circular shaped selections (e.g., circular shaped user indications) by circling one or more options within the documents. For instance, referring to FIG. 6, an individual may fill out the form (e.g., "Person A" or another person may fill out the form) and circle "F" 602 (e.g., female) as the gender for "Person A" and provide "Outpatient" 604 as the type of procedure/level of care for "Person A".

Additional examples of circular shaped user indications are provided in FIGS. 7-9. For example, FIGS. 7-9 show documents with user input in accordance with one or more examples of the present application. Referring to FIGS. 7-9, document 700 includes circular shaped user indications, document 800 includes circular shaped user indication 802, and document 900 includes further circular shaped user indications. In particular, as shown, these circular shaped user indications shown in FIGS. 6-9 are all different and may cause problems. For instance, for the circular shaped user indication 802, two options are selected with "FOR REVIEW" and "PLEASE REPLY". As such, given the numerous differences between different circular shaped user indications, the computing system 104 may use a ML-AI model to detect the different circular shaped user indications that are provided by the individuals and determine the selections (e.g., the text or design) within the different circular shaped user indications.

The computing system 104 may obtain (e.g., receive) the documents (e.g., documents 600-900) from the data sources 102. For instance, the data sources 102 may obtain a plurality of documents from users. One or more of the documents may include text or design selections within circular shaped user indications. The computing system 104 may use an ML-AI model to detect the text or design selections within the circular shaped user indications.

At block 304, the computing system 104 determines circular shaped identification information for a document, of the plurality of documents, based on inputting the document into a trained ML-AI model, wherein the circular shaped identification information indicates the user selection of the design or the text within the one or more circular shaped user indications. For example, after obtaining the documents from the computing system 104, the computing system 104 may input the documents into the trained ML-AI model. The trained ML-AI model may output one or more results indicating detection of the circular shaped user indications and/or a confidence value (e.g., a confidence score such as 0.97) indicating a probability that the detection is accurate. For instance, the results may be and/or include one or more coordinate points within the document associated with the circular shaped user indications. In other words, referring to FIG. 6, based on inputting the document 600 into the ML-AI model, the computing system 104 may determine coordinate points associated with the circular shaped user indications 602 and/or 604. For instance, the coordinate points may be one, two, three, four, and/or more coordinate points that indicate the boundaries surrounding the circular shaped user indications 602 and/or 604. For example, for the circular shaped user indication 602, the ML-AI model may output a result indicating four coordinate points (e.g., four sets of x-axis and y-axis coordinate points) that denote boundary markers (e.g., a rectangular shaped boundary marker) for user selection of the option (e.g., "F"). Using the ML-AI model, the computing system 104 may determine subsets of coordinates for each of the circular shaped user indications. For instance, each subset of coordinates (e.g., four coordinate points) may denote the boundaries for the circular shaped user indication associated with a selection of an option within the document.

In some examples, the computing system 104 may use any type of ML-AI model, dataset, and/or algorithm (e.g., supervised ML-AI algorithms, unsupervised ML-AI algorithms, and/or deep learning algorithms) to determine user selections of an option using a circular shaped user indication (e.g., detect the circular shaped user indications within the document). For example, in some variations, the computing system 104 may use a supervised ML-AI model for detecting the circular shaped user indications. For instance, the computing system 104 may receive user input from an operator (e.g., an individual that trains the ML-AI model) and use the user input to train the ML-AI model. For example, the user input may indicate examples of the circular shaped user indications, and the computing system 104 may use the user input to train the ML-AI model. As mentioned previously, in some variations, a separate computing platform may include the training system 110 and train the ML-AI model. In other variations, a single computing platform may train and use the ML-AI model.

Additionally, and/or alternatively, in some instances, for training and/or updating the ML-AI model, the computing system 104 may obtain data such as documents with circular shaped user indications. The enterprise computing system 112 may prepare the data (e.g., standardize it) and/or otherwise re-format the data such that it is able to be used to train the ML-AI model. The computing system 104 may split the data into training data and test data. Then, the computing system 104 may train the ML-AI model using the training data to reach a target. For example, the computing system 104 may train the ML-AI model by determining whether the training data is continuous or discreet and/or using one or more regression/classification algorithms. After training the ML-AI model, the computing system 104 may test the trained model using the test data. The computing system 104 may perform another continuous or discreet analysis and render a decision. Finally, after the ML-AI model is trained, the computing system 104 may use the trained ML-AI model to determine user selections of an option using a circular shaped user indication (e.g., detect the circular shaped user indications within the document).

At block 306, the computing system 104 performs one or more actions based on the circular shaped identification information. The circular shaped identification information may indicate the user selection(s) of the option (e.g., the selected text or designs) within the document, and the computing system 104 may perform one or more actions based on the circular shaped identification information. For example, as mentioned above, the computing system 104 may include and/or be associated with a display device, and the computing system 104 may display the circular shaped identification information on the display device. In some examples, the computing system 104 may be separate from the display device. For instance, the extraction computing system 108 may include the display device, and may display the circular shaped identification information.

Additionally, and/or alternatively, the computing system 104 may include and/or be associated with a database. The computing system 104 may perform one or more actions such as storing the circular shaped identification information (e.g., the user selections of the options) into the database. Additionally, and/or alternatively, the computing system 104 may standardize and/or convert the detected user selections into a particular file format (e.g., a JSON file format). Subsequently, the computing system 104 may store the detected user selections in a database and/or provide the detected user selections to another computing entity (e.g., the extraction computing system 108).

In some instances, the circular shaped identification information may be an image of the user selections of the option. For instance, based on the coordinate points output from the ML-AI model, the computing system 104 may generate an image associated with the circular shaped user indication. For example, the image may be a cropped out portion of the circular shaped user indication. As such, when displayed on the display device, the computing system 104 may indicate the user selections (e.g., the text or designs) within the document to another individual. Additionally, and/or alternatively, the circular shaped identification information may include the coordinate points that are displayed on the display device.

In some examples, the circular shaped identification information may include the extracted text from the document. For example, the computing system 104 may use a text recognition algorithm (e.g., an OCR) algorithm in combination with the ML-AI model to determine the user selections associated with the circular shaped user indications. This is described in FIG. 4.

FIG. 4 is an exemplary process for using a machine learning model to determine user selections of an option using a circular shaped user indication in accordance with one or more examples of the present application. The process 400 may be performed by the enterprise circular detection computing system 104 (computing system 104) of environment 100 shown in FIG. 1. Additionally, and/or alternatively, the process 400 may be performed by the extraction computing system 108. However, it will be recognized that the process 400 may be performed in any suitable environment and that any of the following blocks may be performed in any suitable order. The descriptions, illustrations, and processes of FIG. 4 are merely exemplary and the process 400 and/or the computing system 104 may use other descriptions, illustrations, and processes for determining user selections within user created circular shaped indications using machine learning models. In particular, process 400 may provide an example of the computing system 104 performing block 304 (e.g., determining the circular shaped identification information for a document based on inputting the one or more documents into a trained ML-AI model).

At block 402, the computing system 104 inputs one or more documents into the trained ML-AI model to determine a plurality of coordinates associated with the one or more circular shaped user indications. For example, as mentioned above, after inputting the document into the trained ML-AI model, the computing system 104 may obtain results from the ML-AI model, which may include coordinates for the detected circular shaped user indications and/or confidence values associated coordinates.

At block 404, the computing system 104 performs a text recognition algorithm (e.g., an OCR algorithm) for the one or more documents to determine a plurality of text for the one or more documents. For example, the computing system 104 may extract text (e.g., characters, numbers, and so on) from the one or more documents using the OCR algorithm and/or another text recognition algorithm. Furthermore, the computing system 104 may determine coordinates within the documents (e.g., x-axis and/or y-axis coordinates) associated with the extracted text. For instance, referring to document 600 of FIG. 6, using the OCR algorithm, the computing system 104 may extract text such as "F" and "M" for the Gender of Person A and/or text such as "Outpatient", "Inpatient", and "In Office" for the type of procedures/level of care for Person A. Furthermore, the computing system 104 may determine coordinate points indicating locations of the text within the document. For example, the characters "F" and "M" as well as "Inpatient", "Outpatient", and "In Office" may have associated coordinate points (x-axis and y-axis coordinate points) indicating their locations within the document 600.

At block 406, based on comparing the plurality of text for the one or more documents the plurality of coordinates from the trained ML-AI model, the computing system 104 determines circular shaped identification information indicating text associated with the user selections off the options. For instance, as mentioned previously, the ML-AI model may output coordinates associated with the circular shaped user indications and the text recognition/OCR algorithm may extract text and/or determine coordinates associated with the extracted text. The computing system 104 may compare the output coordinates from the ML-AI model along with the coordinates associated with the extracted text from the text recognition/OCR algorithm to determine the text within the coordinates of the ML-AI model. For example, referring to FIG. 6, the computing system 104 may determine that the coordinates output from the ML-AI model is associated with the text "F" and the text "Outpatient" from document 600. As such, the computing system 104 generates the circular shaped identification information that indicate the user selections of "F" and "Outpatient" based on using the coordinates output from the ML-AI model and the extracted text from the text recognition/OCR algorithm. The computing system 104 may determine the circular shaped identification information for a plurality of documents such as the documents 700-900 as well.

In some instances, after determining the circular shaped identification information, the computing system 104 may provide the circular shaped identification information to the extraction computing system 108. The extraction computing system 108 may be configured to perform one or more tasks or functions using the circular shaped identification information. For instance, the extraction computing system 108 may standardize and/or convert the circular shaped identification information (e.g., the extracted text) into one or more data formats. Then, the extraction computing system 108 may store the standardized circular shaped identification information into one or more databases.

In some examples, one or more of the documents might not include any circular shaped user indications. The computing system 104 may use the ML-AI model to determine whether the documents include any circular shaped user indications. For instance, the computing system 104 may input the documents into the ML-AI models and the output from the ML-AI models may indicate whether the documents include any circular shaped user indications from the user.

In some variations, the computing system 104 may obtain design information associated with one or more designs within the document. For instance, the document may include a plurality of logos indicating different companies. The computing system 104 may obtain design information indicating the companies associated with the logos. Then, the computing system 104 may identify the designs selected by the user (e.g., the design within the circular shaped user indication) using the obtained design information (e.g., determine which company the user selected based on the logo selected by the circular shaped user indication). The computing system 104 may display the identified design and/or provide the identified design to the extraction computing system 108.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method for detecting circular shaped user indications, comprising:
   obtaining, by a computing system, a plurality of documents, wherein at least one document, of the plurality of documents, comprises one or more circular shaped user indications, wherein each of the one or more circular shaped user indications indicates a user selection of a design or text within the associated circular shaped user indication;

determining, by the computing system, circular shaped identification information for a document, of the plurality of documents based on using a trained machine learning-artificial intelligence (ML-AI) model, wherein the circular shaped identification information indicates the user selection of the design or the text within the associated circular shaped user indication, and wherein determining the circular shaped identification information comprises:

performing a text recognition algorithm for the document to determine a plurality of extracted text for the document and a plurality of extracted coordinate points associated with the plurality of extracted text;

processing the document using the trained ML-AI model to determine a plurality of ML-AI coordinate points, wherein each subset of the plurality of ML-AI coordinate points is associated with a circular shaped user indication of the one or more circular shaped user indications within the document; and determining the circular shaped identification information based on comparing the plurality of ML-AI coordinate points with the plurality of extracted coordinate points; and performing, by the computing system, one or more actions based on the circular shaped identification information.

2. The method of claim 1, wherein performing the one or more actions comprises causing display of one or more images of the text within the associated circular shaped user indication.

3. The method of claim 1, wherein each subset of the plurality of ML-AI coordinate points indicates a detected location of the circular shaped user indication within the document, and wherein determining the circular shaped identification information comprises determining the text associated with the detected location of the circular shaped user indication within the document based on comparing the plurality of ML-AI coordinate points with the plurality of extracted coordinate points.

4. The method of claim 3, wherein determining the text associated with the detected location of the circular shaped user indication within the document comprises:

based on comparing the plurality of ML-AI coordinate points with the plurality of extracted coordinate points, determining counterpart extracted coordinate points to each of the subsets of the plurality of ML-AI coordinate points;

determining extracted text, from the plurality of extracted text, associated with the counterpart extracted coordinate points; and generating the circular shaped identification information based on the determined extracted text.

5. The method of claim 1, wherein the text recognition algorithm is an optical character recognition algorithm.

6. The method of claim 1, further comprising:

training the ML-AI model to detect the one or more circular shaped user indications, wherein the ML-AI model is a supervised ML-AI model.

7. The method of claim 6, wherein training the ML-AI model comprises training, by a second computing system, the ML-AI model, and wherein the method further comprises:

subsequent to training the ML-AI model, receiving, by the computing system and from the second computing system, the trained ML-AI model.

8. The method of claim 1, wherein a second document, of the plurality of documents, does not comprise circular shaped user indications, and wherein the method further comprises:

determining, using the trained ML-AI model, that the second document does not comprise the circular shaped user indications.

9. The method of claim 1, further comprising:

obtaining design information associated with the plurality of documents;

identifying the user selection of the design within the associated circular shaped user indication using the design information; and wherein the circular shaped identification information indicates the identified design.

10. The method of claim 1, wherein performing the one or more actions comprises storing the circular shaped identification information in a database.

11. The method of claim 1, wherein performing the one or more actions comprises converting the circular shaped identification information into a standardized file format, wherein the standardized file format is a JavaScript Objection Notation (JSON) file format.

12. An enterprise circular detection computing system, comprising:

one or more processors; and a non-transitory computer-readable medium having processor-executable instructions stored thereon, wherein the processor-executable instructions, when executed by the one or more processors, facilitate:

obtaining a plurality of documents, wherein at least one document, of the plurality of documents, comprises one or more circular shaped user indications, wherein each of the one or more circular shaped user indications indicates a user selection of a design or text within the associated circular shaped user indication;

determining circular shaped identification information for a document, of the plurality of documents based on using a trained machine learning-artificial intelligence (ML-AI) model, wherein the circular shaped identification information indicates the user selection of the design or the text within the associated circular shaped user indication, and wherein determining the circular shaped identification information comprises:

performing a text recognition algorithm for the document to determine a plurality of extracted text for the document and a plurality of extracted coordinate points associated with the plurality of extracted text;

processing the document using the trained ML-AI model to determine a plurality of ML-AI coordinate points, wherein each subset of the plurality of ML-AI coordinate points is associated with a circular shaped user indication of the one or more circular shaped user indications within the document; and determining the circular shaped identification information based on comparing the plurality of ML-AI coordinate points with the plurality of extracted coordinate points; and performing one or more actions based on the circular shaped identification information.

13. The system of claim 12, wherein performing the one or more actions comprises causing display of one or more images of the text within the associated circular shaped user indication.

14. The system of claim 12, wherein each subset of the plurality of ML-AI coordinate points indicates a detected location of the circular shaped user indication within the document, and wherein determining the circular shaped identification information comprises determining the text associated with the detected location of the circular shaped user indication within the document based on comparing the plurality of ML-AI coordinate points with the plurality of extracted coordinate points.

15. The system of claim 14, wherein determining the text associated with the detected location of the circular shaped user indication within the document comprises:

based on comparing the plurality of ML-AI coordinate points with the plurality of extracted coordinate points, determining counterpart extracted coordinate points to each of the subsets of the plurality of ML-AI coordinate points;

determining extracted text, from the plurality of extracted text, associated with the counterpart extracted coordinate points; and generating the circular shaped identification information based on the determined extracted text.

16. The system of claim 12, wherein the text recognition algorithm is an optical character recognition algorithm.

17. The system of claim 12, wherein the processor-executable instructions, when executed, further facilitate:

training the ML-AI model to detect the one or more circular shaped user indications, wherein the ML-AI model is a supervised ML-AI model.

18. The system of claim 12, wherein the processor-executable instructions, when executed, further facilitate:

obtaining design information associated with the plurality of documents;

identifying the user selection of the design within the associated circular shaped user indication using the design information; and wherein the circular shaped identification information indicates the identified design.

19. A non-transitory computer-readable medium having processor-executable instructions stored thereon, wherein the processor-executable instructions, when executed, facilitate:

obtaining a plurality of documents, wherein at least one document, of the plurality of documents, comprises one or more circular shaped user indications, wherein each of the one or more circular shaped user indications indicates a user selection of a design or text within the associated circular shaped user indication;

determining circular shaped identification information for a document, of the plurality of documents based on using a trained machine learning-artificial intelligence (ML-AI) model, wherein the circular shaped identification information indicates the user selection of the design or the text within the associated circular shaped user indication, and wherein determining the circular shaped identification information comprises:

performing a text recognition algorithm for the document to determine a plurality of extracted text for the document and a plurality of extracted coordinate points associated with the plurality of extracted text;

processing the document using the trained ML-AI model to determine a plurality of ML-AI coordinate points, wherein each subset of the plurality of ML-AI coordinate points is associated with a circular shaped user indication of the one or more circular shaped user indications within the document; and determining the circular shaped identification information based on comparing the plurality of ML-AI coordinate points with the plurality of extracted coordinate points; and performing one or more actions based on the circular shaped identification information.

20. The non-transitory computer-readable medium of claim 19, wherein performing the one or more actions comprises causing display of one or more images of the text within the associated circular shaped user indication.

\* \* \* \* \*